United States Patent
Canton (10) Patent No.: US 8,146,107 B2
(45) Date of Patent: Mar. 27, 2012

(54) VIRTUAL MACHINE ENVIRONMENT FOR INTERFACING A REAL TIME OPERATING SYSTEM ENVIRONMENT WITH A NATIVE HOST OPERATING SYSTEM

(75) Inventor: Dino Canton, Nepean (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1280 days.

(21) Appl. No.: 11/775,569

(22) Filed: Jul. 10, 2007

(65) Prior Publication Data

US 2007/0260447 A1    Nov. 8, 2007

(51) Int. Cl.
*G06F 9/44* (2006.01)
*G06F 9/455* (2006.01)

(52) U.S. Cl. .............. 719/319; 703/23; 718/1
(58) Field of Classification Search ............ 703/23; 718/1; 719/319
See application file for complete search history.

(56) References Cited

U.S. PATENT DOCUMENTS

| | | | |
|---|---|---|---|
| 6,466,962 B2 | 10/2002 | Bollella | |
| 7,434,224 B2 * | 10/2008 | Lescouet et al. | 718/108 |
| 7,461,380 B2 * | 12/2008 | Nishimura | 719/314 |
| 7,574,709 B2 * | 8/2009 | Erlingsson et al. | 719/310 |
| 2004/0098473 A1 * | 5/2004 | Yodaiken | 709/223 |
| 2005/0251806 A1 | 11/2005 | Auslander et al. | |
| 2006/0010446 A1 * | 1/2006 | Desai et al. | 718/100 |
| 2008/0082985 A1 * | 4/2008 | Gagner et al. | 719/312 |

OTHER PUBLICATIONS

EU Search Report, Apr. 24, 2009, Mitel Corporation.
Vibhooti Verma, "Integrated Real-Time Systems" Masters Thesis, Jan. 7, 2007, pp. 1-36, XP002523319 Bombay, India.
"Julana-2 Preview Release 1 Description" Jaluna Report Dec. 1, 2002, pp. 1,3, 5-32, France XP001189063.

* cited by examiner

Primary Examiner — Charles E Anya (57) ABSTRACT

A method for transmitting data to a RTOS environment via a virtual machine environment (VME) includes at least one virtual I/O service, and a custom remote procedure call for relaying calls and call responses between the RTOS and the native HOS by invoking HOS services by means of a proxy, to a non-blocking message queue. A notification is generated and transmitted from the I/O to an interrupt emulator. An interrupt is generated and includes an identifier of the I/O and triggers the RTOS to poll the non-blocking message queue to retrieve data. Relaying the interrupt to the RTOS via a hardware exception handler emulator, which makes the interrupts and an exception appear as if they had occurred on the RTOS natively. Relaying the data to the RTOS when a poll for the data is received at the non-blocking message queue. The VME includes a supervisory instruction emulator for emulating instructions.

15 Claims, 5 Drawing Sheets

VIRTUAL MACHINE ENVIRONMENT FOR INTERFACING A REAL TIME OPERATING SYSTEM ENVIRONMENT WITH A NATIVE HOST OPERATING SYSTEM

FIELD

The specification relates generally to real time operating systems, and specifically to a virtual machine environment for interfacing a real time operating system environment with a native host operating system.

BACKGROUND

A class of products that must react and perform in a deterministic, time sensitive manner relies on real time software, which in turn relies on Real Time Operating Systems (RTOS). An operating system (OS) is a program designed to manage the resources of a computing platform. An RTOS is optimized to manage the resources of computing platform in a highly predictable way so that concepts, such as priority, are strictly enforced, while minimizing the latency involved in servicing events. Such operating systems are designed to be more specialized and accordingly offer much less delay than would be expected from more generic OS's, such as Unix, Linux, Microsoft Windows etc. Communication systems, including telecommunication products like PBXs, are examples of products employing RTOS's. These products are typically very complex and represent thousands of person-years of development.

As computer hardware technology continues to advance, there is a growing demand for taking Real Time Software Applications (RTSAs), for example software for operating a PBX, that previously ran on specialized computing platforms and porting them to modern servers. On the other hand, the software required for an RTSA can be very large, and the cost of modifying it for an OS other than the one for which it was written, is correspondingly large, especially as RTOS performance is typically still required. At the same time there is interest in having such software share the resources of the OS with other applications, in the interest of reducing product cost.

Previous solutions for porting an RTSA to a generic operating system included the concept of a virtual machine. Virtual machine software allows for a single physical machine to appear as one or more virtual instances of the machine from the perspective of the operating system(s), for example an RTOS, and applications executing on the platform. In these solutions, a virtual machine manager (VMM) typically either takes control of the underlying hardware, and schedules the virtual OS instances or runs under an existing operating system (known as the host OS) but requires that the host OS be modified to support special kernel level drivers. This leads to unacceptable latency and poor real time performance, or requires that the system be partitioned so that the underlying hardware is still managed by the RTOS.

Another technique is processor emulation, in which the original target processor for which the application was written is emulated, and the emulation is run on the new host OS. Each instruction of the original processor has to be emulated. However, this technique is not acceptable where efficient real time performance is required.

Other solutions involve modifying an RTSA to run on a different OS to ensure adequate priorities and prevention of interference from adjacent applications sharing the computing resources with the real time application. The cost and complexity of these approaches makes them unattractive.

Another solution, as multiprocessors become more available, is to dedicate one processor to the RTSA with its associated RTOS, and a second processor to other application software running under another OS, such as Linux. The drawback is that hardware such as memory and communications interfaces have to be duplicated as well. In addition, utilization of the processor resources is less efficient since they cannot be arbitrarily shared by the various applications software.

SUMMARY

A first broad aspect of an embodiment seeks to provide a virtual machine environment VME for interfacing a real time operating system (RTOS) environment with a native host operating system (HOS). The VME comprises at least one virtual I/O service for emulating a hardware service available to the native HOS, the at least one virtual I/O service enabled to generate a notification when data is transmitted from the at least one virtual I/O service to the RTOS environment. The VME further comprises a non-blocking messaging queue for exchanging data between the RTOS environment and the at least one virtual I/O service. The VME further comprises an interrupt emulator in communication with the at least one virtual I/O service for generating an interrupt in response to receiving the notification, the interrupt for triggering the RTOS environment to poll the non-blocking message queue to retrieve data from the non-blocking message queue. The VME further comprises a hardware exception handler emulator in communication with the interrupt emulator for relaying the interrupt to the RTOS environment, the hardware exception handler emulator further enabled to manage interrupts and exceptions from the native HOS such that the interrupts and exceptions from the native HOS appear to the RTOS environment as if they had occurred on hardware running the RTOS environment natively; a supervisory instruction emulator in communication with said hardware exception handler emulator, for at least one of: emulating supervisory instructions executed by the RTOS environment; emulating instructions to handle exceptions invoked due to improper use of hardware; and emulating instructions to handle exceptions invoked due to software intent.

In some embodiments of the first broad aspect, the VME further comprises a custom RPC service for relaying calls and call responses between the RTOS environment and the native HOS, by invoking native Host OS services by means of a proxy, the custom RPC service further enabled to generate an RPC notification when data is transmitted from between the custom RPC service and the RTOS environment.

In some embodiments of the first broad aspect, the at least one virtual I/O service comprises a tick/clock service for delivering tick interrupts to the RTOS environment at a fixed rate.

In other embodiments of the first broad aspect, the at least one virtual I/O service comprises a serial I/O service for emulating a serial I/O device in communication with the HOS. In some of these embodiments, the serial I/O service is further enabled for relaying calls and call responses between the RTOS environment by invoking native Host OS services by means of a proxy.

In further embodiments of the first broad aspect, the at least one virtual I/O service comprises an Ethernet service for emulating an Ethernet device in communication with the HOS. In some of these embodiments, the Ethernet service is further enabled for relaying calls and call responses between the RTOS environment by invoking native Host OS services by means of a proxy.

In yet further embodiments of the first broad aspect, the non-blocking message queue comprises at least one queue for delivering data to the RTOS environment, and at least one queue for receiving data from the RTOS environment.

In other embodiments of the first broad aspect, the VME further comprises functions for enabling the RTOS environment to poll the non-blocking message queue for data and retrieve data from the non-blocking message queue. In some of these embodiments, the VME further comprises a shared variable memory for storing at least one of pointers to the functions, wherein the RTOS environment accesses the functions by reading the pointers and retrieving the functions from a memory address associated with the pointer, and the functions.

In other embodiments of the first broad aspect, the VME further comprises a VME library for storing functions used by the RTOS environment for interacting with the VME. In some of these embodiments, the VME library is further enabled to store functions used by at least one of: the at least one virtual I/O service, the custom RPC service, the non-blocking message queue, the interrupt emulator, the supervisory instruction emulator, and the hardware exception handler emulator. In some embodiments, the VME library comprises a services library, a message library, a queue library, a semaphore library, and a custom threading library.

In some embodiments of the first broad aspect, the RTOS environment comprises VxWorks. In other embodiments of the first broad aspect, the native HOS comprises at least one of Microsoft Windows, Microsoft DOS, MAC OS X, UNIX, LINUX and SOLARIS.

In further embodiments of the first broad aspect exceptions invoked due to software intent comprise at least one of software traps and debug instructions.

A second broad aspect of an embodiment seeks to provide a method for transmitting data to the RTOS environment via the VME, the data intended for the RTOS environment. A first step of the method comprises transmitting the data from the at least one virtual I/O service, or the custom RPC, to the non-blocking message queue. A second step of the method comprises generating the notification and transmitting the notification from the at least one virtual I/O service to the interrupt emulator. A third step of the method comprises generating the interrupt at the interrupt emulator, in response to receiving the notification. A fourth step of the method comprises relaying the interrupt to the RTOS environment via the hardware exception handler. A fifth step of the method comprises relaying the data to the RTOS environment when a poll for the data is received at the non-blocking message queue from the RTOS environment, the poll triggered at the RTOS environment by the interrupt.

In some embodiments of the second broad aspect, the method further comprises receiving the data from the native HOS. In some of these embodiments, the method further comprises receiving the data from a hardware device in communication with the native HOS.

BRIEF DESCRIPTION OF THE DRAWINGS

Embodiments are described with reference to the following figures, in which.

DETAILED DESCRIPTION OF THE EMBODIMENTS

Figure 1:
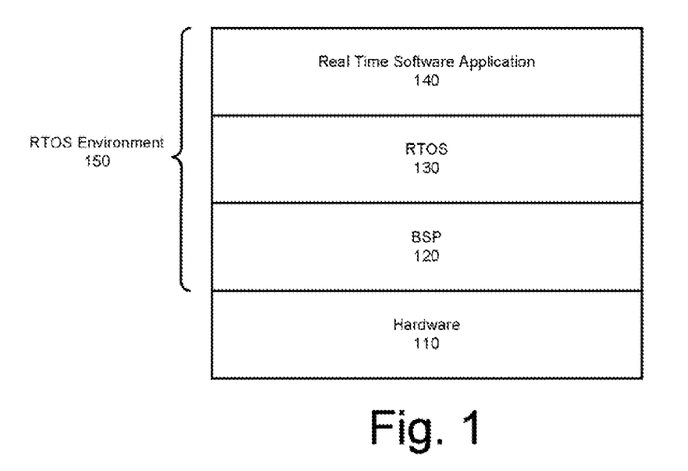
FIG. 1 depicts a software stack architecture of a real time operating system, according to the prior art.

FIG. 1 depicts a software stack architecture of a real time operating system environment 150, according to the prior art. The real time operating system environment 150 comprises an RTOS 130, a board support package (BSP), and an RTSA 140. The RTOS 120 manages the hardware and software resources of a computer by interfacing with computer hardware 110 via the BSP 120. The real time software application 140 runs on the RTOS 130. The BSP 120 comprises at least one software driver for interfacing with the computer hardware 110.

Figure 2:
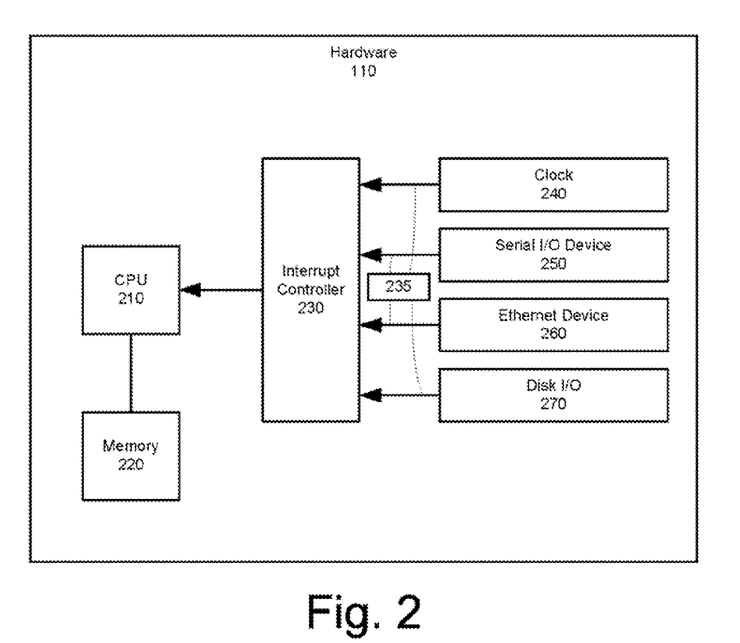
FIG. 2 depicts a computer hardware architecture, according to the prior art.

FIG. 2 depicts the computer hardware 110 according to the prior art. The computer hardware 110 comprises a central processing unit (CPU) 210, which executes the real time operating system environment 150, in communication with a memory 220 and an interrupt controller 230. The interrupt controller controls interrupts 235 transmitted to the CPU 210 from various devices including, but not limited to, a clock 240, a serial input/output (I/O) device 250 (e.g. a universal asynchronous receiver transmitter (UART)), an Ethernet device 260, and a disk I/O 270. The interrupt controller 230 prioritizes the interrupts 235 and conveys them to the CPU 210. Upon receiving an interrupt, for example one of the interrupts 235, the CPU 210 saves its current state of execution and invokes an interrupt handler for processing the interrupt. The CPU 210 may then switch to a different execution state to process whatever situation (e.g. arrival of data from one of the various devices) the interrupt was announcing. The CPU 210 may be managing several different execution states simultaneously. The use of interrupts in association with different saved execution states is a method of exception handling, as known to one of skill in the art. In some embodiments, the CPU 210 runs in one of two modes:

a. A user mode, in which most instructions in an application or an OS can be executed; and
 b. A supervisor mode, in which all instructions can be executed, including instructions that modify the state of the CPU 210, for example a supervisory instruction, and access privileges. The supervisor mode is also known as privileged mode, and supervisory instructions are also known as privileged instructions. Some examples of supervisory instructions include, but are not limited to, the correct handling of a flag (status) register's interrupt flag (IF), interpretation of a vector table, manipulation of various processor registers of the CPU 210, the creation of a contextually correct exception frame on a stack, and manipulation of the MMU (Memory Management Unit) of the CPU 210, and accessing the I/O memory space of the CPU 210.

An RTOS running on the CPU 210 typically runs with the CPU 210 in supervisor mode. This allows an RTSA direct access to the CPU 210 resources to reduce latency.

In situations where the hardware 110 is dedicated to running the RTOS 130 and the RTSA 140, the RTOS 130 may be written for execution on a specific type of CPU. In addition, the RTOS 130 generally uses a shared physical memory for running different software threads (i.e. threads of execution, including threads dedicated to operating system processes, and threads dedicated to RTSA processes). In this manner, the RTOS 130 exhibits reduced latency as compared to a non-real time operating system, which generally uses logical memory (i.e. an addressing scheme implemented in hardware and software that allows non-contiguous memory to be addressed as if it were contiguous, hence requiring an additional software layer to map the logical memory to the physical memory).

Figure 3:
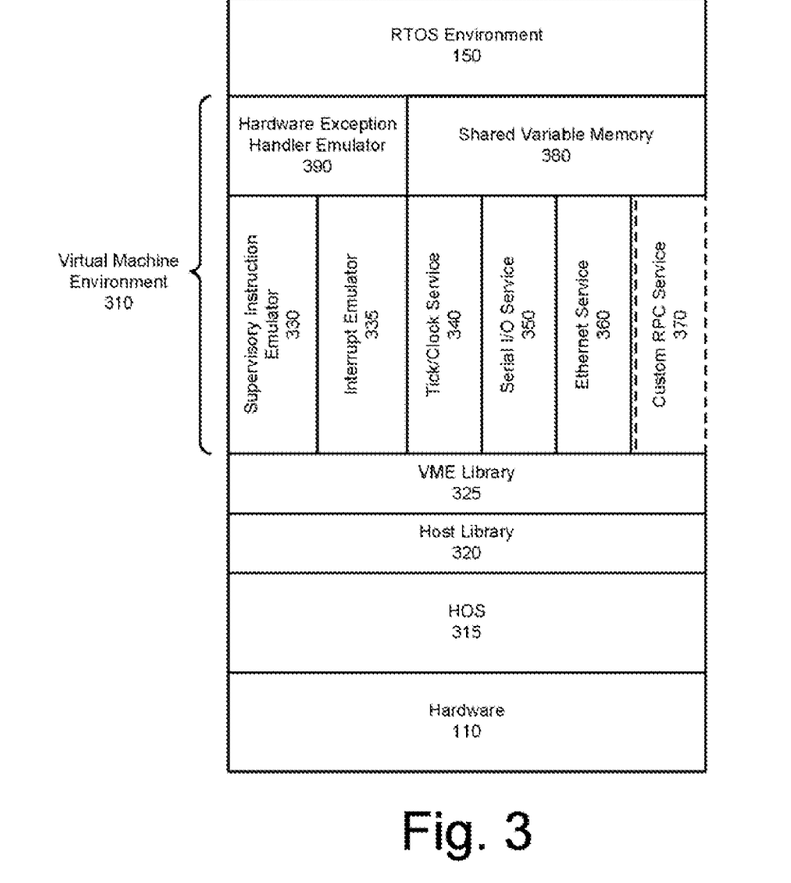
FIG. 3 depicts a software stack architecture for running an RTOS environment in a non-RTOS environment, according to a non-limiting embodiment.

FIG. 3 depicts a software stack architecture for running the RTOS environment 150 of FIG. 1 in a non-RTOS environment, for example on a host operating system (HOS) 315 enabled to run on the computer hardware 110. In general, the RTOS 130 runs as an application on the HOS 315, the HOS 315 being unaware that it is executing another operating system. However, to enable the running of the RTOS 130 on the HOS 315, a virtual machine environment (VME) 310 also runs as an application on the HOS 315.

The HOS 315 is typically not an RTOS, but a generic operating system. In some embodiments, the HOS 315 comprises an industry standard OS including, but not limited to, Microsoft Windows, Microsoft DOS, MAC OS X, UNIX, LINUX, SOLARIS. The HOS 315 has access to a host library 320 for storing Application Program Interfaces (APIs) and/or subroutines and/or functions used by the HOS 315 and applications running on the HOS 315. The APIs and/or subroutines and/or functions generally comprise "helper" code and data, as known to one of skill in the art. This allows code and data to be shared and changed in a modular fashion between applications.

Figure 9:
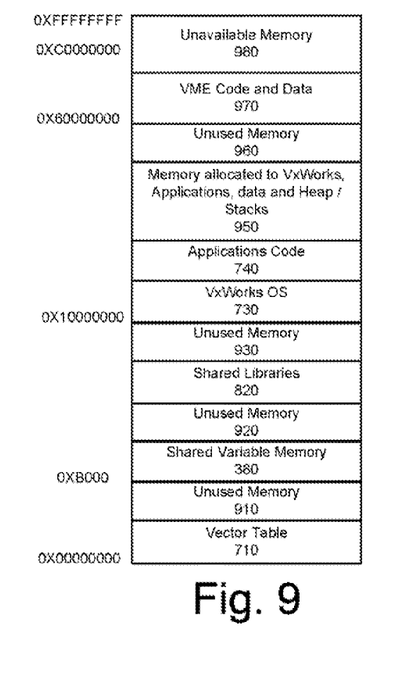
FIG. 9 depicts how VxWorks is mapped in a memory, when VxWorks runs as an application on Linux, according to a non-limiting embodiment.

The VME 310 emulates the hardware and/or software services normally used by the RTOS 130 when the RTOS 130 is running as the native OS on the hardware 110, as depicted in FIG. 1, without having to emulate the CPU 210 itself, as would occur with processor emulation software. Rather, the VME 310 reproduces the behaviour of the hardware 110. Whereas if the RTOS 130 was running as the native OS, the BSP 120 would normally interface with the hardware 110 to communicate commands, interrupts and data, in the architecture of FIG. 3 the RTOS 130 instead interfaces with the VME 310. Hence the BSP 120 is adapted to communicate with software interfaces in the VME 310. The various commands, interrupts and data are sent and received from memory and/or programmatically while the RTOS 130 is running under the HOS 315. This memory is shared with other threads running under the HOS 315, which in turn interact with the HOS 315 to gain functional access to the hardware 110. A non-limiting example of an RTOS sharing a memory with other threads running under a HOS is depicted in FIG. 9, described below.

Hence, the VME 310 comprises service emulators which emulate the services of at least a portion of the hardware 110. The service emulators comprise at least one virtual I/O service (e.g. a tick/clock service 340, a serial I/O service 350 and/or an Ethernet service 360, described below) and at least one interrupt/exception service (e.g. an interrupt emulator 335 and/or a supervisory instruction emulator 330). The at least one virtual I/O service interfaces with the RTOS environment 150 via a non-blocking message queue 570, described in detail below with reference to FIG. 5. When the RTOS 130 attempts to transmit or receive data through a virtual I/O service, the BSP 120 interacts with the non-blocking message queue 570. In some embodiments, the non-blocking message queue 570 comprises a queue from the RTOS environment 150 to the at least one virtual I/O service and a queue from the at least one virtual I/O service to the RTOS environment 150. In other embodiments, the non-blocking message queue comprises a queue per virtual I/O service per direction.

The VME 310 further comprises a shared variable memory 380 which comprises a portion of the memory 220 of the computing hardware 110 of FIG. 2, the portion of the memory 220 located at a location known to the RTOS environment 150, and to the VME 310. In one non-limiting embodiment, the shared variable memory 380 is populated with pointers to data structures, as well as pointers to functions that manipulate the data structures, for example functions contained within a VME library 325, described below and/or the Host library 320. In other embodiments, the shared variable memory 380 may be populated with data structures and with functions that manipulate the data structures. In other embodiments, the shared variable memory 380 may be populated with a combination of pointers to data structures, data structures, pointer to functions that manipulate the data structures, and/or functions that manipulate the data structures. In one non-limiting embodiment, the shared variable memory 380 comprises pointers to functions which allow the RTOS environment 150 to access the non-blocking message queue 570, and receive data from the at least one virtual I/O service via the non-blocking message queue 570.

With continued reference to FIG. 3, and further reference to FIG. 5, described below, the at least one virtual I/O service implements a specific I/O service including, but not limited to:

The tick/clock service 340. The tick/clock service 340 comprises a service for delivering tick interrupts to the RTOS environment 150 at a fixed rate, via the non-blocking message queue 570. In some embodiments, the tick/clock service 340 delivers clock ticks to the RTOS environment 150 from a clock device in communication with the HOS 315, for example the clock 240 of FIG. 2. In other embodiments, the tick/clock service 340 comprises a clock emulator driven by a clock API stored in either the host library 320 or the VME library 325. In one non-limiting embodiment, the tick/clock service 340 comprises a tick thread 510 to deliver tick interrupts to the RTOS environment 150 at a fixed rate, via the non-blocking message queue 570. In some embodiments the tick thread 510 further comprises a converging, adaptive filler for buffering any jitter introduced by the HOS 315. In other embodiments, other types of filters may be used.

The serial I/O service 350. The serial I/O service 350 comprises a service for emulating a serial I/O device/file, for example the serial I/O device 250. The serial I/O service 350 enables the exchange of data between the RTOS environment 150 and a serial I/O device/file via the HOS 315, via the non-blocking message queue 570. The serial I/O service 350 comprises a serial I/O "in" thread 520 for passing data from the RTOS environment 150 to the serial I/O device/file via the HOS 315. Data sent through the serial I/O in thread 520 from the RTOS environment 150 is redirected to the serial I/O device/file on the HOS 315. The serial I/O service 350 further comprises a serial I/O "out" thread 530 for transmitting data from a serial I/O device/file to the RTOS environment 150 via the HOS 315. Data from the serial device/file on the HOS 315, intended for the RTOS environment 150, is redirected through the serial I/O service 350, and specifically the serial I/O in thread 520, to the RTOS environment 150. In other words, when the RTOS 130 attempts to transmit or receive data through the serial I/O device 250 of FIG. 2, the BSP 120 actually interacts with the serial I/O service 350 via the non-blocking message queue 570.

The Ethernet service 360. The Ethernet service 360 comprises a service for emulating an Ethernet device/file, for example the Ethernet device 260. The Ethernet service 360 enables the exchange of Ethernet packets between the RTOS environment 150 and an Ethernet device/file via the HOS 315. The Ethernet service 360 comprises an Ethernet "in" thread 540 for passing data from the RTOS environment 150 to the Ethernet device/file via the HOS 315. Data sent through the Ethernet in thread 540 from the RTOS environment 150 is redirected to the Ethernet device/file on the HOS 315. The Ethernet service 360 further comprises an Ethernet "out" thread 550 for transmitting data from an Ethernet device/file to the RTOS environment 150 via the HOS 315. Data from the Ethernet device/file on the HOS 315, intended for the RTOS environment 150, is redirected through the Ethernet service 360, and specifically the Ethernet out thread 550, to the RTOS environment 150. In other words, when the RTOS 130 attempts to transmit or receive packets through the Ethernet device 260 of FIG. 2, the BSP 120 actually interacts with the Ethernet service 360 via the non-blocking message queue 570;

In some embodiments, the VME 310 further comprises a custom remote procedure call (RPC) service 370, for relaying calls and call responses between the RTOS environment 150 and the HOS 315, which enables the RTOS environment 150 to invoke native Host OS services (e.g. API(s) and/or libraries associated with the HOS 315, for example host library 320) by means of a proxy. This allows the RTOS environment 150 to continue to run without blocking, even when a normally blocking call to a native Host OS service is dispatched from the RTOS environment 150 via the custom RPC service. The custom RPC service 370 comprises an RPC thread 560 for each task within the RTOS environment 150 which is initiating a call to a HOS API and/or subroutine and/or function in the host library 320 and the custom libraries 325f. However in other embodiments, the calls to a native Host OS service may be dispatched via at least one virtual I/O service. In a non-limiting example, the calls to a native Host OS service (and call responses) may be dispatched via the Ethernet service 360 or the serial I/O service 350.

The interrupt/exception services include, but are not limited to the interrupt simulator 335 and/or the supervisory instruction emulator 330. The interrupt simulator 335 and the supervisory instruction emulator 330 are in communication with a hardware exception handler emulator 390, which is in communication with the RTOS environment 150. The interrupt simulator 335 is enabled to generate and transmit interrupts to the hardware exception handler emulator 390, which handles the interrupts and transmits them to the RTOS 130. In some embodiments, the hardware exception handler emulator 390 is effectively emulating the internal exception handling functionality of the CPU 210 and the interrupt controller 230 of FIG. 2.

The hardware exception handler emulator 390, in conjunction with the supervisory instruction emulator 330 is further enabled to manage and emulate exceptions. There are two basic classes of exceptions that may be emulated by the VME 310:

A first basic class of exceptions comprises externally generated events that are translated so that they appear as hardware interrupts to the RTOS environment 150. These events are handled by the at least one virtual I/O service or the custom RPC service 370, as described above; and A second basic class of exceptions comprises exceptions generated by software running in the RTOS environment 150. These exceptions include, but are not limited to: exceptions generated by instructions that cannot be executed as they are supervisory instructions; exceptions generated due to improper use of the hardware 110, for example the CPU 210, and include divide by zero errors, memory access errors and the like; and exceptions invoked due to program intent, and include traps, debug exceptions and the like, as known to one of skill in the art.

The hardware exception handler emulator 390, in conjunction with the supervisory instruction emulator 330 is further enabled to manage and emulate the second class of exceptions.

Hence the supervisory instruction emulator 330 is enabled to emulate supervisory instructions and instructions to handle exceptions invoked to due improper use of hardware or software intent, as described above; and the hardware exception handler emulator 390 is enabled to translate exceptions that may occur in the RTOS environment 150, the results in a HOS exception, into what appears as an exception generated by a CPU, for example the CPU 210, running the RTOS environment natively.

In some embodiments, the RTOS environment 150 may be modified such that supervisory instructions are not attempted by the RTOS environment 150, but rather are handled via functions that may be added to the RTOS environment 150. In these embodiments, the supervisory instruction emulator 330 is enabled to handle exceptions invoked to due improper use of hardware or software intent, as described above.

Each of the virtual I/O services, including the tick/clock service 340, the serial I/O service 350, the Ethernet service 360, as well as the custom RPC service 370 if applicable, is further enabled to communicate with the interrupt emulator 335, to cause the interrupt emulator 335 to generate an interrupt when data (e.g. a message from the clock tick, and/or data arriving from a serial device, and/or packets arriving from an Ethernet device and/or a blocking/unblocking message from a native Host OS service) is being made available to the RTOS environment 150 via the non-blocking message queue 570.

In some embodiments, the VME 310 may further comprise the VME library 325, which comprises custom subroutines or functions used by the other elements of the VME 310. For example, the at least one virtual I/O service (and the custom RPC 370) rely on the VME library 325 to implement the emulation of the hardware services (and an RPC). In general, the VME library 325 is designed to: work around limitations found in the host library 320; extend the capabilities of the host library 320; provide custom features not found in the host library 320; and provide optimizations for a multiprocessor environment, in embodiments where the hardware 110 comprises multiple CPUs.

Figure 4:
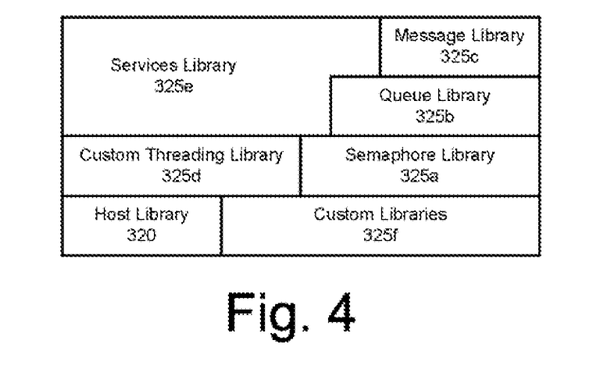
FIG. 4 depicts detail of a virtual machine environment library and a host library, according to a non-limiting embodiment.

In some embodiments, the VME library 325 or portions of the VME library 325 may be combined with the host library 320. In some embodiments, the VME library 325 may be partitioned into sublibraries. FIG. 4 depicts a non-limiting embodiment of the VME library 325, with elements of the VME library 325 depicted with a number 325x. In this embodiment, the VME library 325 may comprise:
- a semaphore library 325a, which provides basic thread synchronization. In some embodiments, the basic thread synchronization is based on a shared memory spin lock mechanism that uses atomic memory operation to ensure exclusive access, as known to one of skill in the art;
- a queue library 325b, which provides a multithreading/multiprocessing safe mechanism for inter thread communication;
- a message library 325c, which extends the capabilities of the queue library 325b to support message delivery and notification;
- a custom threading library 325d, which, in some embodiments, replaces the standard HOS threading library in order to work around limitations found in the standard HOS library that can make implementation of the VME 310 difficult;
- a services library 325e, which enables the simplified creation of client/server threads and associated inter thread communications mechanisms; and/or
- custom libraries 325f, which provides other subroutines used by the VME 310.

Other embodiments of the VME library 325 may comprise other libraries.

The HOS library 320 is further depicted in FIG. 4, in a non-limiting embodiment of how the HOS library 320 and the VME library 325 are integrated in the software stack architecture.

Figure 5:
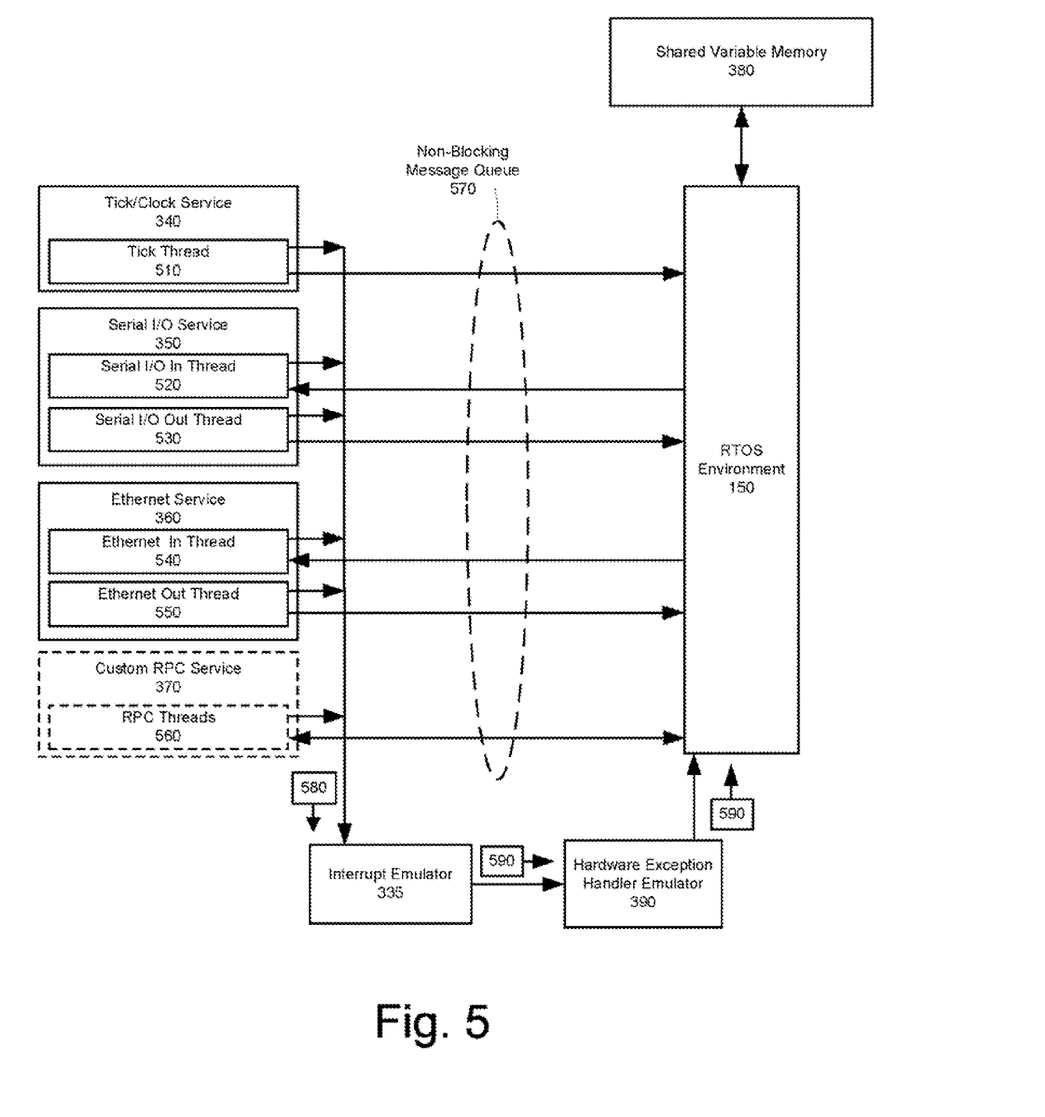
FIG. 5 depicts a runtime environment of the virtual I/O threads of the software stack architecture of FIG. 3, according to a non-limiting embodiment.
Figure 6:
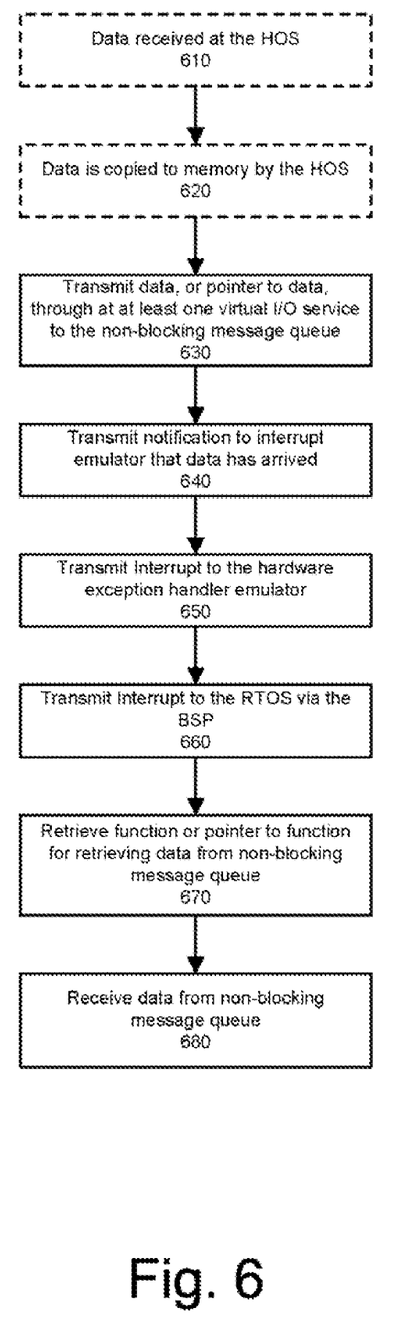
FIG. 6 depicts a method for receiving data at the RTOS, via the virtual I/O threads of FIG. 4, according to a non-limiting embodiment.

Turning now to FIGS. 5 and 6, with further reference to FIG. 3. FIG. 5 depicts a runtime environment of the virtual I/O threads of the software stack architecture of FIG. 3, according to non-limiting embodiment. Aspects of interaction between the elements of FIGS. 3 and 5 will be described with reference to FIG. 6.

FIG. 6 depicts a method of receiving data at the RTOS 130, via the virtual I/O threads of FIG. 5. The method of FIG. 6 may be executed within the software stack architecture of FIG. 3, according to the runtime environment of FIG. 5.

In some embodiments, at step 610, data is received at the HOS 315, the data intended for the RTOS environment 150. In some embodiments, the data is received from a hardware device, for example the clock 240, the serial device I/O device 250, the Ethernet device 260, the disk I/O 270, or another device. In other embodiments, the data is received from a HOS API and/or subroutine and/or function in the host library 320, for example a HOS API and/or subroutine and/or function that had been earlier called by the RTOS environment 150 via the custom RPC service 370. In these embodiments, the data may comprise a blocking or unblocking message. In these embodiments, at step 620, the data is copied to memory, for example the memory 220, by the HOS 315.

At step 630, the data or, a pointer to the data, is passed through the at least one virtual I/O service, which corresponds to the device from where the data was received, to the non-blocking message queue 570.

In embodiments where the data was received from the serial I/O device 250, the data, or the pointer to the data, is transmitted to the non-blocking message queue 570 by the serial I/O service 350, via the serial I/O out thread 530. In embodiments where the data was received from the Ethernet device 260, the data, or the pointer to the data, is transmitted to the non-blocking message queue 570 by the Ethernet service 360, via the Ethernet out thread 550. In embodiments where the data comprises a clock tick, was received from the clock 240, the data, or the pointer to the data, is transmitted to the shared variable memory 380 by the tick/clock service 340, via the tick thread 510. In embodiments where the at least one virtual I/O service comprises the tick/clock service 340 comprising a clock emulator driven by a clock API stored in the VME 325, the tick/clock service 340 originates the data, or a pointer to the data, at step 630.

In those embodiments where the VME 310 comprises the custom RPC service 370, and the data comprises a blocking or unblocking signal received from a HOS API and/or subroutine and/or function that had been earlier called by the RTOS environment 150, the data, or the pointer to the data, is transmitted through the non-blocking message queue 570 by the custom RPC service 360, via the RPC thread 560.

At step 640, a notification 580 is transmitted by the virtual I/O service which corresponds to the device from where the data was received (or the custom RPC service 370), to the interrupt emulator 335, the notification 580 comprising information which notifies the interrupt emulator 335 that data intended for the RTOS environment 150 is available to the RTOS environment 150 via the non-blocking message queue 570, and requires the attention of a device driver in the RTOS environment 150, for example via the BSP 120. In some embodiments the notification 580 comprises an identifier of the service which originates the notification 580, for example a reference number which identifies the service to the RTOS environment 150.

At step 650, an interrupt 590 is generated by the interrupt emulator 335 and transmitted to the hardware exception handler emulator 390. At step 660, the hardware exception handler emulator 390, forwards the interrupt 590 to the RTOS 130, which triggers the RTOS 130 to save its state, and execute an RTOS based exception handler, in order to retrieve and process the data as would occur if the RTOS environment 150 was running as the native OS, as known to one of skill in the art. In some embodiments the interrupt 590 comprises an identifier of the service which originates the notification 580, for example a reference number which identifies the service to the RTOS environment 150 which passed to the interrupt emulator 335 via the notification 580.

At step 670, in embodiments where the shared variable memory 380 contains a pointer to a function for manipulating data structures, for example functions which allow the RTOS environment 150 to access the non-blocking message queue 570, and receive data from the at least one virtual I/O service via the non-blocking message queue 570, the interrupt 590 further triggers the thread in the RTOS environment 150 to retrieve a pointer to a function for retrieving and processing the data from the non-blocking message queue 570.

At step 680, the RTOS environment 150 receives the data from the non-blocking message queue 570. In some embodiments, the RTOS environment 150 polls each of the queues in the non-blocking message queue 570 in order to receive the data. In embodiments where the interrupt comprises an identifier of the service which originates the notification 580, the RTOS environment 570 polls the specific queues in the non-blocking message queue 570, which corresponds to the service which originated the notification 580.

In embodiments where the RTOS environment 150 wishes to transmit data to a hardware device, for example the serial I/O device 250, the Ethernet device 260, the disk I/O 270 or another hardware device, it transmits the data, or a pointer to the data to the appropriate virtual I/O service via the non-blocking message queue 570, to the HOS 315, which then copies it to the associated hardware device. Similarly, in embodiments that comprise the custom RPC service 370, calls to a native Host OS service from the RTOS environment 150 can be transmitted down the custom RPC service 370, via the non-blocking message queue 570, to the HOS 315, which then processes the call.

When the RTOS environment 150 is running as the native OS on the hardware 110, it generally runs in supervisor mode as described above. However, when the RTOS environment 150 is running on top of the VME 310, the HOS 315 allows it to run only in user mode. In some embodiments, this may lead to situations where the RTOS environment 150 attempts to process a supervisory instruction, for example instructions that are intended to deal with the hardware 110 directly and that would have implications for other applications or the HOS 315.

In some embodiments, the HOS 315 captures the supervisory instruction, and an exception is raised and transmitted back to the RTOS environment 150. The hardware exception handler simulator 390 intercepts and examines the exception and identifies which supervisory instruction was attempted by the RTOS environment 150. The supervisory instruction emulator 330 then emulates the desired supervisory instruction. In some embodiments, some supervisory instructions may be difficult to emulate. In these embodiments, the RTOS environment 150 may be modified to execute commands which are functionally equivalent to otherwise inaccessible supervisory instructions. In some embodiments, exceptions originating at the HOS 315 are delivered to a process using a user level exception mechanism in the HOS 315, as known to one of skill in the art. The hardware exception handler emulator 390 handles these exceptions and interacts with the interrupt emulator 335 to translate user mode signals from the HOS 315 into context specific emulated exceptions, including stack setup and reading of the vector table etc. In this manner, the hardware exception handler emulator 390 emulates the behaviour of a CPU, for example the CPU 210, such that any exceptions or interrupts raised or delivered by the RTOS environment 150 appears to the RTOS environment 150 as if it had occurred on a CPU running the RTOS environment 150 natively.

In general, the memory 220 comprises sufficient physical memory to hold the VME 310, the RTOS environment 150 and the HOS 315. Furthermore, the memory 220 is generally locked and not available for swapping by the HOS 315.

Figure 7:
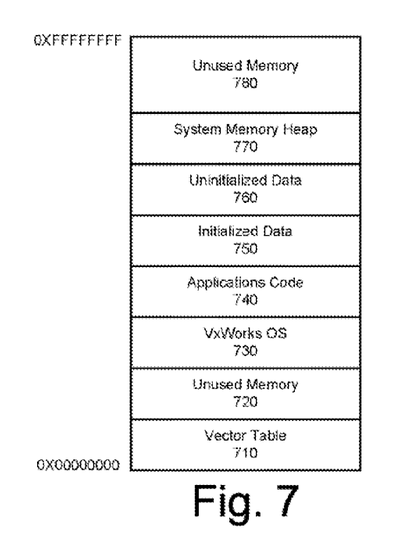
FIG. 7 depicts a non-limiting example of how a real time application is mapped in a memory, when VxWorks is running as the native OS, according to the prior art.

In a specific non-limiting embodiment, the RTOS 130 comprises VxWorks from Wind River, 500 Wind River Way, Alameda, Calif. 94501, and the HOS 315 comprises Linux. FIG. 7 depicts a typical example of how an application is mapped in the memory 220, when VxWorks is running as the native OS on the hardware 110, the memory 220 comprising a vector table 710, VxWorks OS code 730, applications code 740, initialized data 750, uninitialized data 760, a system memory heap 770, unused memory 720, and unused memory 780, stored at memory addressed ranging between 0X00000000 and 0XFFFFFFFF. In this example, the depicted map is a physical map to the memory 220.

Figure 8:
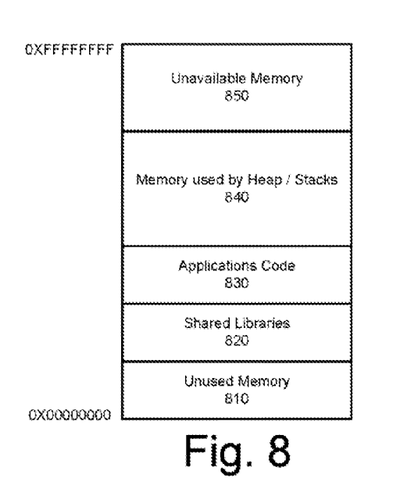
FIG. 8 depicts a non-limiting example of how an application is mapped in a memory, when Linux is running as the native OS, according to the prior art.

FIG. 8 depicts a typical example of how an application is mapped in the memory 220, when Linux is running as the native OS on the hardware 110, the memory 220 comprising shared libraries 820, for example the host library 320, applications code 830, memory used by Linux heaps/stacks 840, unused memory 810, and unavailable memory 850, stored at memory addressed ranging between 0X00000000 and 0XFFFFFFFF. In this example, the depicted map is a logical map to the memory 220.

FIG. 9 depicts an embodiment of a map of the memory 220, in embodiments where VxWorks runs as an application on Linux, via the VME 310. In these embodiments, the memory 220 comprises: the vector table 710; the shared variable memory 380; the shared libraries 820; the VxWorks OS code 730; the applications code 740; memory allocated to VxWorks, applications, data and heap/stacks, including but not limited to the initialized data 750, the uninitialized data 760, and the system memory heap 770; the VME code and data 970, including but not limited to the VME library 325, the applications code 830, and memory used by the heap/stacks 840; and unused memory 910, unused memory 920, unused memory 930, unused memory 960, and unavailable memory 980. The various elements of the memory 220 are stored at addresses ranging between 0X00000000 and 0XFFFFFFFF. In this example, the depicted map is a logical map to the memory 220.

In some embodiments, the hardware 110 further comprises at least two CPUs and the HOS 315 is enabled to support a multiprocessing environment. While one CPU is executing the RTOS environment 150, the other CPU can concurrently service the VME 150. This concurrent processing may provide a very low latency environment. Furthermore, by using two or more CPUs, changes of the kernel of the HOS 315, for example a patch of the kernel, and the creation of special device drivers are avoided. In these embodiments, spin lock semaphores may be used to arbitrate access to shared data to further reduce latency. The spin lock semaphores may be used, for example, to protect critical data regions being accessed via the message queue 570. In these embodiments, the semaphore library 325a comprises code to support spin lock semaphores.

Those skilled in the art will appreciate that in some embodiments, the functionality of the RTOS environment 150, the VME 310 and the HOS 315 may be implemented using pre-programmed hardware or firmware elements (e.g., application specific integrated circuits (ASICs), electrically erasable programmable read-only memories (EEPROMs), etc.), or other related components. In other embodiments, the functionality of the RTOS environment 150, the VME 310 and the HOS 315 may be achieved using a computing apparatus that has access to a code memory (for example the memory 220) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method for transmitting data to a real time operating system (RTOS) environment via a virtual machine environment (VME), the method including computer hardware enabled to run the VME for interfacing the RTOS environment with a native host operating system (HOS), the data intended for the RTOS environment, the method comprising:

transmitting, the data, from at least one virtual input/output (I/O) service of a plurality of virtual input/output (I/O)

services, to the native HOS, wherein said virtual I/O service emulates a hardware service available to the native HOS and wherein said transmitting of said data, is performed by a custom remote procedure call (RPC) of the VME for relaying calls and call responses between the RTOS environment and the native HOS by invoking native HOS services by means of a proxy, to a non-blocking message queue;

generating a notification and transmitting said notification from said at least one virtual I/O service to an interrupt emulator of the VME, wherein said notification includes an identifier of said virtual I/O service that originates said notification;

generating an interrupt at said interrupt emulator, in response to receiving said notification, wherein said interrupt include an identifier of said virtual I/O service that originates said notification and triggering the RTOS environment to poll the non-blocking message queue to retrieve data from said non-blocking message queue;

relaying said interrupt to said RTOS environment via a hardware exception handler emulator of the VME, wherein the hardware exception handler emulator relays said interrupt by triggering said RTOS to save its state and is enabled to manage said interrupts and an exception from the native HOS to make said interrupts and said exception appear to the RTOS environment as if they had occurred on hardware running the RTOS environment natively; and relaying said data to the RTOS environment when a poll for said data is received at said non-blocking message queue from the RTOS environment, said poll triggered at the RTOS environment by said interrupt, wherein said VME further comprises a supervisory instruction emulator, in communication with said hardware exception handler emulator, for at least one of:

emulating supervisory instructions executed by the RTOS environment;

emulating instructions to handle exceptions invoked due to improper use of hardware; and emulating instructions to handle exceptions invoked due to software intent.

2. The VME of claim 1, wherein said at least one virtual I/O service comprises a tick/clock service for delivering tick interrupts to the RTOS environment at a fixed rate.

3. The VME of claim 1, wherein said at least one virtual I/O service comprises a serial I/O service for emulating a serial I/O device in communication with the native HOS.

4. The VME of claim 1, wherein said at least one virtual I/O service comprises an Ethernet service for emulating an Ethernet device in communication with the native HOS.

5. The VME of claim 4, where said Ethernet service is further enabled for relaying calls and call responses between the RTOS environment by invoking native Host OS services by means of said proxy.

6. The VME of claim 1, wherein said non-blocking message queue comprises at least one queue for delivering data to the RTOS environment, and at least one queue for receiving data from the RTOS environment.

7. The VME of claim 1, further comprising a shared variable memory for storing at least one of pointers to said functions, wherein said RTOS environment accesses said functions by reading said pointers and retrieving said functions from a memory address associated with said pointer, and said functions.

8. The VME of claim 1, further comprising a VME library for storing functions used by the RTOS environment for interacting with the VME.

9. The VME of claim 8, said VME library is further enabled to store functions used by at least one of: the at least one virtual I/O service, the custom RPC service, the non-blocking message queue, the interrupt emulator, the supervisory instruction emulator, and the hardware exception handler emulator.

10. The VME of claim 9, wherein said VME library comprises a services library, a message library, a queue library, a semaphore library, and a custom threading library.

11. The VME of claim 1, wherein the RTOS environment comprises VxWorks®.

12. The VME of claim 1, wherein the native HOS comprises at least one of Microsoft Windows, Microsoft disk operating system (DOS), MAC OS® X, UNIX®, LINUX® and SOLARIS®.

13. The VME of claim 1, wherein said exceptions invoked due to software intent comprise at least one of software taps and debug instructions.

14. The method of claim 1, further comprising receiving the data from the native HOS.

15. The method of claim 14, further comprising receiving the data from a hardware device in communication with the native HOS.

* * * * *